(12) United States Patent
Innes et al.

(10) Patent No.: US 10,829,126 B2
(45) Date of Patent: Nov. 10, 2020

(54) METHODS AND APPARATUS FOR VEHICLE OPERATION ANALYSIS

(71) Applicant: AT&T Intellectual Property I, L.P., Atlanta, GA (US)

(72) Inventors: Timothy Innes, Atlanta, GA (US); Stephen Mitchell, Atlanta, GA (US); Soe Naing, Atlanta, GA (US); Matthew O'Donnell, Schwenksville, PA (US); Andrew Silva, Alpharetta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/259,710

(22) Filed: Jan. 28, 2019

(65) Prior Publication Data
US 2019/0152489 A1 May 23, 2019

Related U.S. Application Data

(63) Continuation of application No. 15/091,859, filed on Apr. 6, 2016, now Pat. No. 10,189,479.

(51) Int. Cl.
*B60W 40/09* (2012.01)
*H04W 4/02* (2018.01)
(Continued)

(52) U.S. Cl.
CPC ........... *B60W 40/09* (2013.01); *G07C 5/0841* (2013.01); *H04W 4/027* (2013.01); *H04W 4/44* (2018.02);
(Continued)

(58) Field of Classification Search
USPC ..................................................... 701/32.3
See application file for complete search history.

(56) References Cited

U.S. PATENT DOCUMENTS

| 3,310,662 A | 3/1967 | Greenshields |
| 3,634,866 A | 1/1972 | Meyer |

(Continued)

FOREIGN PATENT DOCUMENTS

| DE | 102005025271 | 9/2009 |
| EP | 2296124 | 3/2011 |

(Continued)

OTHER PUBLICATIONS

Baldwin et al., "The Driver Monitor System: A Means of Assessing Driver Performance," Johns Hopkins APL Technical Digest, vol. 25, No. 3, 2004, 9 pages.
(Continued)

*Primary Examiner* — Tyler D Paige
(74) *Attorney, Agent, or Firm* — Amin, Turocy & Watson, LLP

(57) ABSTRACT

Methods and apparatus are disclosed to monitor and evaluate vehicle operator behavior. An example apparatus includes at least one processor to process image data to identify a traffic sign in relation to a vehicle; identify a driver event using a pattern of objects including the traffic sign and the vehicle in the image data; and evaluate compliance with a driver event rule for the driver event by at least: a) calculating a proximity of the traffic sign to the vehicle based on i) a distance between the vehicle and the traffic sign and ii) an operating state of the vehicle; b) comparing the proximity of the traffic sign and the operating state of the vehicle to determine an actual vehicle operating behavior; and c) generating a score associated with operation of the vehicle by comparing the actual vehicle operating behavior with the reference vehicle operating behavior.

20 Claims, 11 Drawing Sheets

(51) Int. Cl.
*G07C 5/08* (2006.01)
*H04W 4/44* (2018.01)
*G07C 5/00* (2006.01)

(52) U.S. Cl.
CPC ..... *B60W 2420/42* (2013.01); *B60W 2520/10* (2013.01); *B60W 2554/4041* (2020.02); *B60W 2555/60* (2020.02); *B60W 2556/50* (2020.02); *G07C 5/008* (2013.01)

(56) References Cited

U.S. PATENT DOCUMENTS

| | | |
|---|---|---|
| 6,268,804 B1 | 7/2001 | Janky et al. |
| 6,679,702 B1 | 1/2004 | Rau |
| 6,714,894 B1 | 3/2004 | Tobey et al. |
| 8,248,223 B2 | 8/2012 | Periwal |
| 8,554,468 B1 | 10/2013 | Bullock |
| 8,630,768 B2 | 1/2014 | McClellan et al. |
| 8,666,629 B2 | 3/2014 | Fekete et al. |
| 8,849,501 B2 | 9/2014 | Cook et al. |
| 8,876,535 B2 | 11/2014 | Fields et al. |
| 8,930,229 B2 | 1/2015 | Bowne et al. |
| 9,053,516 B2 | 6/2015 | Stempora |
| 9,053,591 B2 | 6/2015 | Phelan et al. |
| 9,081,650 B1 | 7/2015 | Brinkmann et al. |
| 9,135,803 B1 | 9/2015 | Fields et al. |
| 9,180,888 B1 | 11/2015 | Fields et al. |
| 9,535,878 B1* | 1/2017 | Brinkmann ............ G06F 17/00 |
| 10,189,479 B2* | 1/2019 | Innes ................... B60W 40/09 |
| 2004/0236474 A1 | 11/2004 | Chowdhary et al. |
| 2007/0027583 A1* | 2/2007 | Tamir ................. G06Q 30/0283 701/1 |
| 2008/0243558 A1 | 10/2008 | Gupte |
| 2010/0253541 A1* | 10/2010 | Seder .................... G01S 13/931 340/905 |
| 2012/0021386 A1 | 1/2012 | Anderson et al. |
| 2012/0123806 A1 | 5/2012 | Schumann, Jr. et al. |
| 2013/0046562 A1 | 2/2013 | Taylor et al. |
| 2013/0204645 A1 | 8/2013 | Lehman et al. |
| 2014/0080098 A1 | 3/2014 | Price |
| 2014/0111647 A1* | 4/2014 | Atsmon ................. H04N 7/185 348/148 |
| 2014/0113619 A1 | 4/2014 | Tibbitts et al. |
| 2014/0162219 A1* | 6/2014 | Stankoulov .......... G09B 19/167 434/65 |
| 2014/0172467 A1 | 6/2014 | He et al. |
| 2015/0120336 A1 | 4/2015 | Grokop et al. |
| 2015/0213555 A1* | 7/2015 | Barfield, Jr. ........... G06Q 40/08 705/4 |
| 2015/0254955 A1 | 9/2015 | Fields et al. |
| 2016/0350812 A1 | 12/2016 | Priness et al. |
| 2017/0291611 A1 | 10/2017 | Innes et al. |

FOREIGN PATENT DOCUMENTS

| | | |
|---|---|---|
| EP | 2469477 | 6/2012 |
| GB | 2328820 | 3/1999 |
| GB | 2443645 | 5/2008 |
| JP | 4985056 | 7/2012 |
| WO | 2005003885 | 1/2005 |
| WO | 2015057741 | 4/2015 |

OTHER PUBLICATIONS

Bergasa et al., "Real-Time System for Monitoring Driver Vigilance," IEEE Transactions on Intelligent Transportation Systems, vol. 7, No. 1, Mar. 2006, 15 pages.

El-Shawarby et al., "Evaluation of Driver Deceleration Behavior at Signalized Intersections," Mar. 30, 2007, 19 pages.

Ji et al., "Real-Time Eye, Gaze, and Face Pose Tracking for Monitoring Driver Vigilance," Real-Time Imaging 8, available online at http://www.idealibrary.com, 2002, 21 pages.

Johnson et al., "Driving Style Recognition Using a Smartphone as a Sensor Platform," 2011 14th International IEEE Conference on Intelligent Transportation Systems Washington, DC, USA. Oct. 5-7, 2011, 7 pages.

Oliver et al., "Graphical Models for Driver Behavior Recognition in a SmartCar," Media Laboratory Massachusetts Institute of Technology (MIT), 2000, 6 pages.

Takeda et al., "International Large-Scale Vehicle Corpora for Research on Driver Behavior on the Road," IEEE Transactions on Intelligent Transportation Systems, vol. 12, No. 4, Dec. 2011, 15 pages.

United States Patent and Trademark Office, "Non Final Office Action," issued in connection with U.S. Appl. No. 15/091,859, dated Jul. 7, 2017, 16 pages.

United States Patent and Trademark Office, "Final Office Action," issued in connection with U.S. Appl. No. 15/091,859, dated Dec. 27, 2017, 20 pages.

United States Patent and Trademark Office, "Non Final Office Action," issued in connection with U.S. Appl. No. 15/091,859, dated Apr. 13, 2018, 15 pages.

United States Patent and Trademark Office, "Notice of Allowance," issued in connection with U.S. Appl. No. 15/091,859, dated Sep. 17, 2018, 10 pages.

United States Patent and Trademark Office, "Advisory action," issued in connection with U.S. Appl. No. 15/091,859, dated Mar. 30, 2018, 7 pages.

* cited by examiner

METHODS AND APPARATUS FOR VEHICLE OPERATION ANALYSIS

RELATED APPLICATION

This patent claims priority to U.S. patent application Ser. No. 15/091,859 filed on Apr. 6, 2016, entitled "METHODS AND APPARATUS FOR VEHICLE OPERATION ANALYSIS." The entirety of U.S. patent application Ser. No. 15/091,859 is incorporated herein by reference.

FIELD OF THE DISCLOSURE

This disclosure relates generally to vehicle operation, and, more particularly, to methods and apparatus for vehicle operation analysis.

BACKGROUND

Mobile devices, such as tablets, smartphones, and cameras, are widely used in monitoring and communications today. Mobile devices help to track individuals and items and provide a greater sense of security and connectedness. Mobile devices, however, remain disconnected from many aspects of human life and activity. Many untapped opportunities exist that can benefit from information capture and processing via a mobile device.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
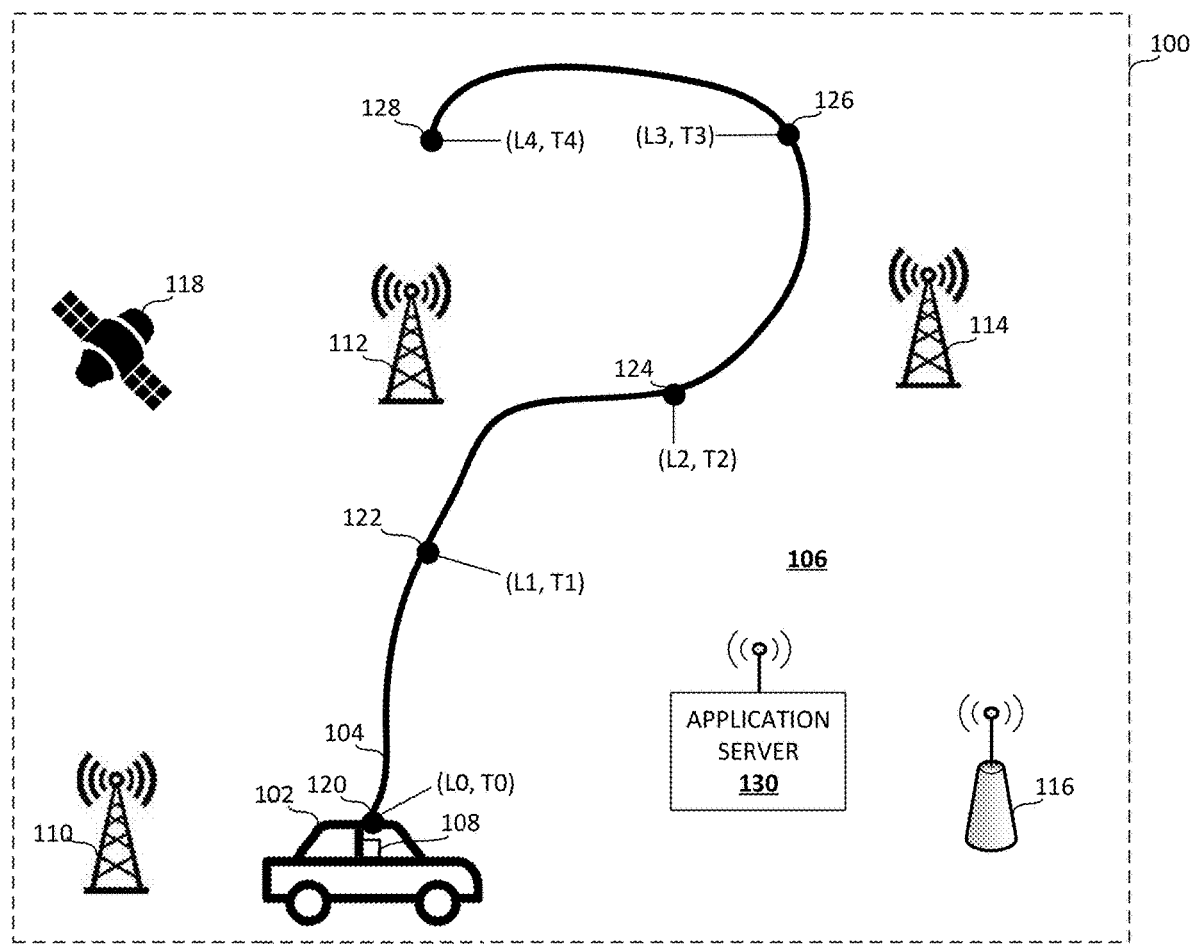
FIG. 1 depicts an example data collection environment.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Using an onboard camera and one or more sensors, data regarding vehicle operation can be harvested from digital image processing, which is then compared against car state information and geo-location data to evaluate vehicle/driver performance. Mobile application feedback can provide a summary with an overall score for driver behavior, as well as an individual breakdown for each monitored metric, for example.

Such a monitoring, evaluation, and feedback mechanism helps to monitor drivers in training (e.g., student drivers, truckers and/or other delivery drivers in training, etc.), for example. Parents can monitor and receive feedback regarding the quality of their child's driving behavior, for example. Additionally, insurance companies can use the evaluation data to provide discounts, rebates, etc., to drivers with exceptional driving behavior (e.g., scoring greater than a threshold, etc.), for example. Insurance cost for a driver can be better calculated with an improved understanding of that driver's risk, for example. Companies who employ drivers can use the evaluation data to help ensure employees are compliant with acceptable business guidelines, for example. Vehicle manufacturers can change vehicle design based on understanding customer driving patterns, for example. Law enforcement can apply analytics to deduce a cause of an accident or pursue a theft, for example. Accidents can be reduced or prevented based on an improved understanding of area driving behavior, for example. Evaluations can occur in a snapshot and/or be compiled over time to show a composite score, trend in behavior, etc.

Certain examples provide systems and methods to monitor operation of a vehicle by a driver and generate a report that assigns a score to the driver's behavior based on a combination of factors measured by sensors and processed. For example, digital image data analysis, location services, and car status or state information (e.g., speed) can be combined to form a report card including a driver score for each factor and an overall or aggregate score for total performance. Digital image data analysis can be facilitated using one or more machine learning techniques to break down the recorded image data, such as providing video footage to an artificial neural network and using independent component analysis to identify objects and relationships in the image data. The object and relationship analysis can be used with geo-location services (e.g., global positioning system (GPS)) and car status (e.g., stopped, parked, traveling at a certain speed, etc.) to generate score(s) for the associated driver. Scoring can be used to evaluate the driver's performance with respect to factors such as obeying stop signs, obeying traffic lights, speeding, turn-signal usage, cornering g-force (e.g., sharpness of a turn), lane centering (e.g., staying in a designated lane), and lead-car proximity (e.g., closeness to a car in front of the monitored vehicle). Such evaluations can be used by a variety of audiences including: 1) by parents of younger drivers, 2) by insurance companies to evaluate driver behavior and reconstruct accidents, 3) by auto and other manufacturers to gauge customer usage and behavior, and 4) by law enforcement in instances of accidents, carjacking, theft, etc.

Thus, certain examples provide a data monitoring, aggregation, analysis, and reporting platform to process information from multiple vehicle-based systems and generate an analysis illustrating driver behavior.

FIG. 1 is an example data collection environment 100 including an example vehicle 102 (e.g., an automobile, truck, sport utility vehicle, all-terrain vehicle, airplane, helicopter, boat, etc.) moving along a path 104 in an example geographic area 106. The vehicle 102 includes a mobile device 108 which monitors operation of the vehicle 102 and communicates with one or more external devices to exchange information regarding the vehicle 102 and operation of the vehicle 102.

The example mobile device 108 can be implemented using, for example, a laptop computer, a tablet, a smartphone, an application specific integrated circuit (ASIC), and/or any other type of mobile computing device. In some examples, the mobile device 108 can be a subcomponent of another device. In some examples, the mobile device 108 can be connected to and/or integrated within the motorized vehicle 102 that can be driven and/or maneuvered within the example geographic area 106.

In the illustrated example of FIG. 1, the geographic area 106 includes the path 104 (e.g., a road, waterway, route, etc.) as well as one or more communication devices, such as cellular base station(s) 110, 112, 114 and/or one or more example wireless access point(s) 116. The example mobile device 108 can acquire, receive, access and/or utilize one or more form(s) of cellular and/or WiFi® connectivity within the example area 106 via one or more of the communication devices 110, 112, 114, 116 to support one or more type(s) of communication services (e.g., location determination, text messaging, voice calling, network browsing, streaming media, etc.) via a cellular and/or Wi-Fi® service provider such as AT&T®, Verizon®, T-Mobile®, Sprint®, etc.). In the illustrated example, the mobile device 108 can also communicate with one or more Global Positioning System (GPS) satellite(s) 118 to identify a location of the mobile device 108 within the example geographic area 106 based on one or more signal(s) from the satellite 118.

For example, the signal(s) received by the mobile device 108 from the GPS satellite 118 may contain information from which the current latitude, longitude and/or altitude of the mobile device 108 can be identified and/or derived. The signal(s) received by the mobile device 108 from the GPS satellite 118 may also include information from which a current time can be identified and/or derived.

Using information from the one or more communication devices 110, 112, 114, 116, 118, the mobile device 108 may receive and/or be able to determine a location of the vehicle 102 corresponding to the mobile device 108 at a point in time. Thus, as shown in the illustrated example of FIG. 1, the mobile device 108 can communicate with the one or more communication devices 110, 112, 114, 116, and/or 118 to determine a plurality of locations 120, 122, 124, 126, 128 of the vehicle 102 as the vehicle is operated along the path 104. The locations 120-128 can be latitude and longitude coordinates, relative location within the geographic area 106, and/or other indication of a location (e.g., L0, L1, L2, L3, L4, etc.) of the vehicle 102 at a point in time (e.g., T0, T1, T2, T3, T4, etc.). A speed of the vehicle 102 can be determined based on a change in location (e.g., L0 to L1) over a period of time (e.g., T0 to T1), for example.

The example mobile device 108 can also communicate with an application server 130 (e.g., a communication server, a cloud-based server, etc.) to receive and/or transmit information regarding location, operating state, operating behavior, etc., with respect to the vehicle 102. The mobile device 108 can also transmit video footage (e.g., obtained via the mobile device 108, from a dashboard camera (not shown) in communication with the mobile device 108, etc.) to the application server 130 for analysis, for example.

Using a plurality of measured factors (e.g., vehicle 102 location, speed, captured video analysis, and/or other operating state information), a behavior of the vehicle 102 (and, thereby, driver) can be analyzed and determined. An evaluation of the determined behavior can be used to generate a score for the driver associated with the vehicle 102. The score can be generated by comparing driver behavior to a "normal" or reference driver behavior, for example. The reference behavior can be represented by a profile or set of one or more scores compiled and quantified according to one or more driving metrics that have been measured from representative drivers and/or specified by law, for example.

Figure 2:
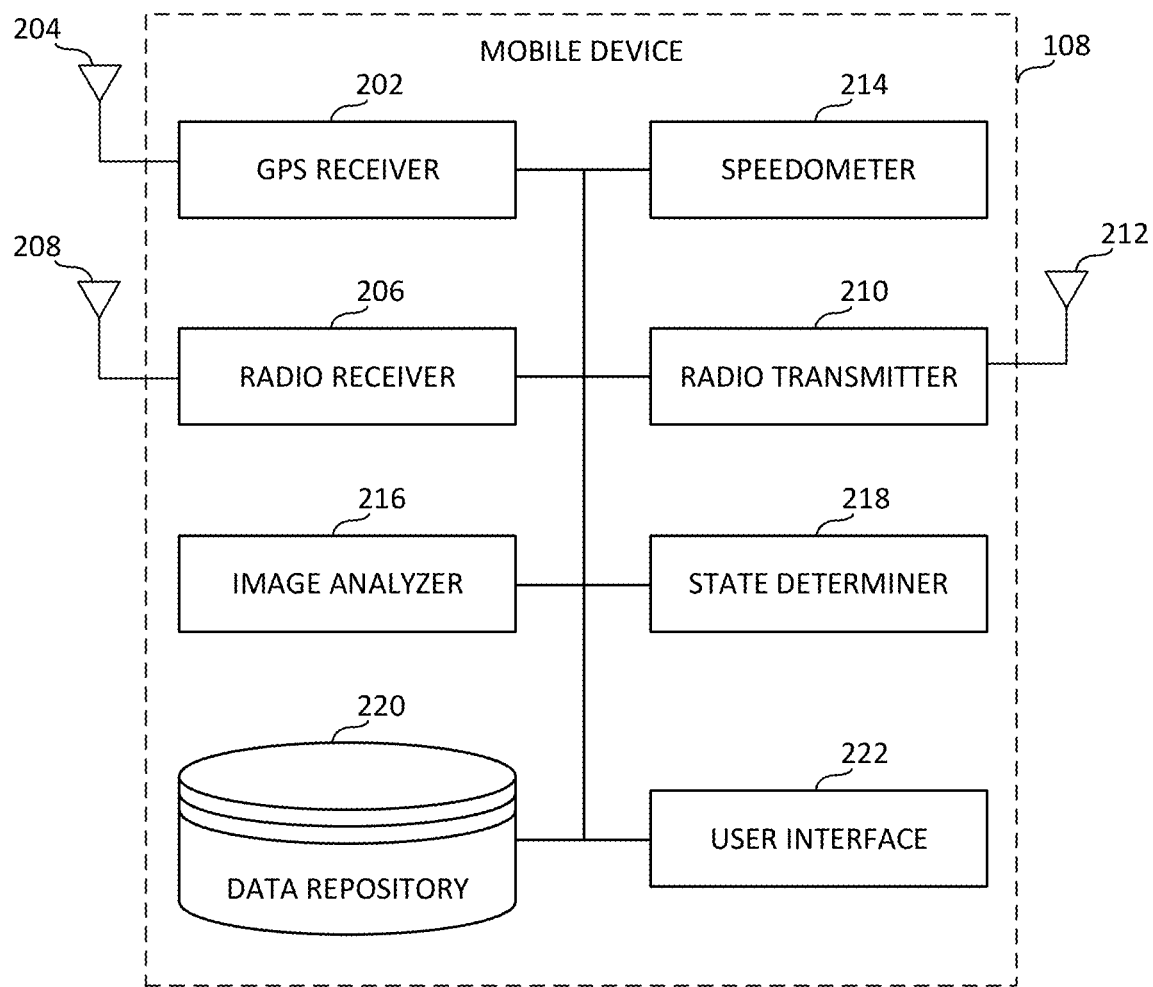
FIG. 2 illustrates further detail regarding an implementation of the example mobile device of FIG. 1.

FIG. 2 illustrates further detail regarding an implementation of the example mobile device 108 of FIG. 1. In the illustrated example of FIG. 2, the mobile device 108 includes an example GPS receiver 202 with an example antenna 204, an example radio receiver 206 with an example antenna 208, an example radio transmitter 210 with an example antenna 212, an example speedometer 214, an example image analyzer 216, an example state determiner 218, an example data repository 220, and an example user interface 222. However, other example implementations of the mobile device 108 may include fewer or additional structures to process information to analyze and qualify vehicle (and associated driver) behavior in accordance with the teachings of this disclosure.

In the illustrated example of FIG. 2, the example GPS receiver 202 collects, acquires and/or receives one or more signals from one or more GPS satellites (e.g., the GPS satellite 118 of FIG. 1), as described above. In the illustrated example, the GPS receiver 202 includes the example antenna 204 to facilitate the receipt of one or more signals from the one or more GPS satellites. The signal(s) received by the GPS receiver 202 may include information from which current the location of the mobile device 108 may be identified and/or derived, including for example, the current latitude, longitude and/or altitude of the mobile device 108. The signal(s) received by the GPS receiver 202 may also contain information from which the current time can be identified and/or derived. Data identified and/or derived from the signal(s) collected and/or received by the example GPS receiver 202 may be stored in a computer-readable storage medium such as the example data repository 220 described below.

In the illustrated example of FIG. 2, the example radio receiver 206 collects, acquires and/or receives one or more cellular and/or WiFi® signals from one or more cellular base stations (e.g., the example cellular base stations 110, 112, 114 of FIG. 1) and/or one or more wireless access points (e.g., the example wireless access point 116 of FIG. 1), as described above. In the illustrated example, the radio receiver 206 includes an example antenna 208 to facilitate the receipt of one or more signals from the one or more cellular base stations and/or wireless access points including information that can be used to identify the location of the mobile device 108 at a given time. For example, the radio receiver 206 may receive cellular and/or Wi-Fi® signals via which the mobile device 108 may implement an Assisted GPS (A-GPS) process and/or Location Based Services (LBS). Data identified and/or derived from the signal(s) collected and/or received by the example radio receiver 206 may be stored in a computer-readable storage medium such as the example data repository 220 described below. Location information can also be displayed via the example user interface 222 (e.g., a display screen, liquid crystal display (LCD), light emitting diode (LED), touchscreen display, etc.) of the mobile device 108, for example.

In the illustrated example of FIG. 2, the example radio transmitter 210 transmits one or more cellular and/or WiFi® signals to one or more cellular base stations (e.g., the example cellular base stations 110, 112, 114 of FIG. 1) and/or one or more wireless access points (e.g., the example wireless access point 116 of FIG. 1). In the illustrated example, the radio transmitter 210 includes an example antenna 212 to facilitate the transmission of one or more signals to the one or more cellular base stations and/or wireless access points. In some examples, the transmission of one or more signals from the example radio transmitter 210 to the one or more cellular base stations and/or wireless access points may result in the one or more base stations and/or wireless access points transmitting to the example radio receiver 206 one or more signals including information from which location and/or other operating state information may be identified and/or derived. The example radio transmitter 210 may also be used to transmit information from the mobile device 108 to the application server 130, for example.

In the illustrated example of FIG. 2, the example speedometer 214 receives location and time information 120-128 from the GPS receiver 202 and/or radio receiver 206 and uses the location and time information 120-128 to determine a speed at which the vehicle 102 is traveling. Alternatively or in addition, the speedometer 214 can be in communication with the vehicle 102 to measure the vehicle's speed (e.g., by communicating with the vehicle's speedometer, engine, draft shaft, etc.).

In the illustrated example of FIG. 2, the example image analyzer 216 receives image data (e.g., video footage, still images, etc.) from an external camera, such as a dashboard camera, (e.g., via the radio receiver 206) and/or from a camera integrated with the mobile device 108 (not shown). The image analyzer 216 processes the video and/or still image data to identify objects and relationships in the image data.

For example, one or more machine learning techniques such as an artificial neural network (also referred to as a neural network), other pattern recognition, etc., can be applied by the image analyzer 216 to the image data to identify objects and/or other features in the image data. An artificial neural network can be implemented by the image analyzer 216 in a variety of ways. In certain examples, the image analyzer 216 forms the artificial neural network locally. In other examples, the image analyzer 216 communicates with an external device, such as the example application server 130, which implements the artificial neural network. Neural networks and/or other machine learning methods can be used to identify features in the image data, a task which is otherwise difficult using rules-based programming.

An artificial neural network is first trained based on known or reference data. Training can involve tuning weights for various elements or nodes in the network using the known, predetermined, or reference data (e.g., image data in which identification and location of objects and/or other features in the image is already known). The trained neural network can then be used on additional image data to analyze and identify features of interest (e.g., stop signs, traffic lights, vehicles, pedestrians, cross-walks, etc.). The artificial neural network can leverage information from the data repository 220, for example, to assist in training and implementing the neural network. The artificial neural network can store network weights and/or other configuration information in the data repository 220, for example.

The example artificial neural network can be implemented in a variety of ways including with principal component analysis, independent component analysis, cascade learning, etc. For example, an artificial neural network with independent component analysis can be used to isolate features in an image (e.g., facial recognition, sign recognition, other object recognition, etc.). Using independent component analysis (also known as blind source separation), a set of independent components is sought from a combination of elements. That is, individual objects or features are sought amongst a plurality of image data (e.g., from dashboard camera footage, etc.). In independent component analysis, two components or features are considered independent if knowledge of one component implies nothing about the other component. Independent component analysis can be used by an artificial neural network to analyze data points (e.g., pixels, voxels, etc.) in the image data and organize related data points (e.g., by color, by proximity, by identified boundary, etc.) into objects or features in the image data.

Weights (also referred to as network weights or neural network weights) can be determined based on data point values and arrangements identified in analyzed image data. For example, an initial set of weights can be determined by neural network analysis of image data during a network training phase. One or more of the weights can be modified by values, patterns, etc., analyzed during an operational phase of the artificial neural network, for example.

In certain examples, using cascade learning (also referred to as cascading learning or cascade correlation), involves beginning with a minimal network of nodes (also referred to as neurons or units), which then automatically trains and expands the network to add new "hidden" nodes, resulting in a multi-layered structure. Once a new hidden node has been added to the network, its input-side weights are frozen. The unit then becomes a feature-detector in the network, available for producing outputs or for creating other, more complex feature detectors. Using cascade learning, the neural network can determine its own size and topology and retains the structures it has built even if its training set changes, for example. Cascade learning can be used by the artificial neural network to evaluate portions of the image data for object/feature detection, for example.

In certain examples, the artificial neural network can employ both independent component analysis and cascade learning to target relevant features in the image data (e.g., within the dashboard camera or "dash-cam" footage). The feature transformation technique of independent component analysis combined with cascade learning allows the neural network to isolate local features within an image.

The artificial neural network (or an array of artificial neural networks at an external device such as the example application server 130, etc.) is trained to target a set of important objects (e.g., stop signs, traffic lights, car bumpers, pedestrians, crosswalks, obstacles, etc.). Once these objects are identified in the image data, the image analyzer 216 applies geometry to calculate distance (e.g., distance between identified objects in the image data, distance between an object and the vehicle 102, etc.).

In the illustrated example of FIG. 2, the example state determiner 218 receives information from one or more of the GPS receiver 202, radio receiver 206, speedometer 214, the image analyzer 216, the data repository 220, and the user interface 222 to determine an operating state of the vehicle 102 (and/or its driver). Available data from these sources is combined by the state determiner 218 to evaluate a quality of driving and/or other operational state associated with the vehicle.

For example, the state determiner 218 combines data from the above sources (e.g., the GPS receiver 202, radio receiver 206, speedometer 214, image analyzer 216, data repository 220, user interface 222, etc.), when available, to determine an operating state of the vehicle 102 and/or its operator/driver. An operator's quality of driving can be quantified based on a plurality of driving events identified and evaluated using data from the available sources. Driving events can include stop signs, traffic lights, vehicle speed, turn signal usage, cornering g-force, lane centering (e.g., how well the vehicle 102 stays in its lane), lead car proximity (e.g., a measure of tailgating), etc.

In certain examples, the state determiner 218 compares data analysis of dashboard camera and/or other image footage from the image analyzer 216 against geo-location data from the GPS receiver 202 and/or radio receiver 206, vehicle speed information from the speedometer 214, and/or other vehicle 102 and/or operator state information provided to the mobile device 108. For example, as the vehicle 102 approaches a stop sign, the image analyzer 216 identifies the stop sign object from the video feed from a camera in the vehicle 102. Distance traveled and vehicle speed are also monitored to determine if the driver brought the vehicle 102 to a complete stop at the stop sign, rolled through the stop sign without coming to a complete stop, or ran the stop sign. The driver's behavior at this stop sign event is added by the state determiner 218 (alone or in conjunction with the application server 130) to other stop sign events. An average stop sign metric can be calculated over a given time period by the state determiner 218 and/or the application server 130. Other events related to the driving metrics identified above can be similarly calculated, alone or in combination.

The state determiner 218 and/or the application server generates a score or set of scores for the driver of the vehicle and provides a summary with an overall score for driver behavior, as well as an individual breakdown for each metric via the user interface 222 of the mobile device. Such information can also be stored in the data repository 220 for continued monitoring, trending, and/or use in further metric analysis, for example.

Figure 3:
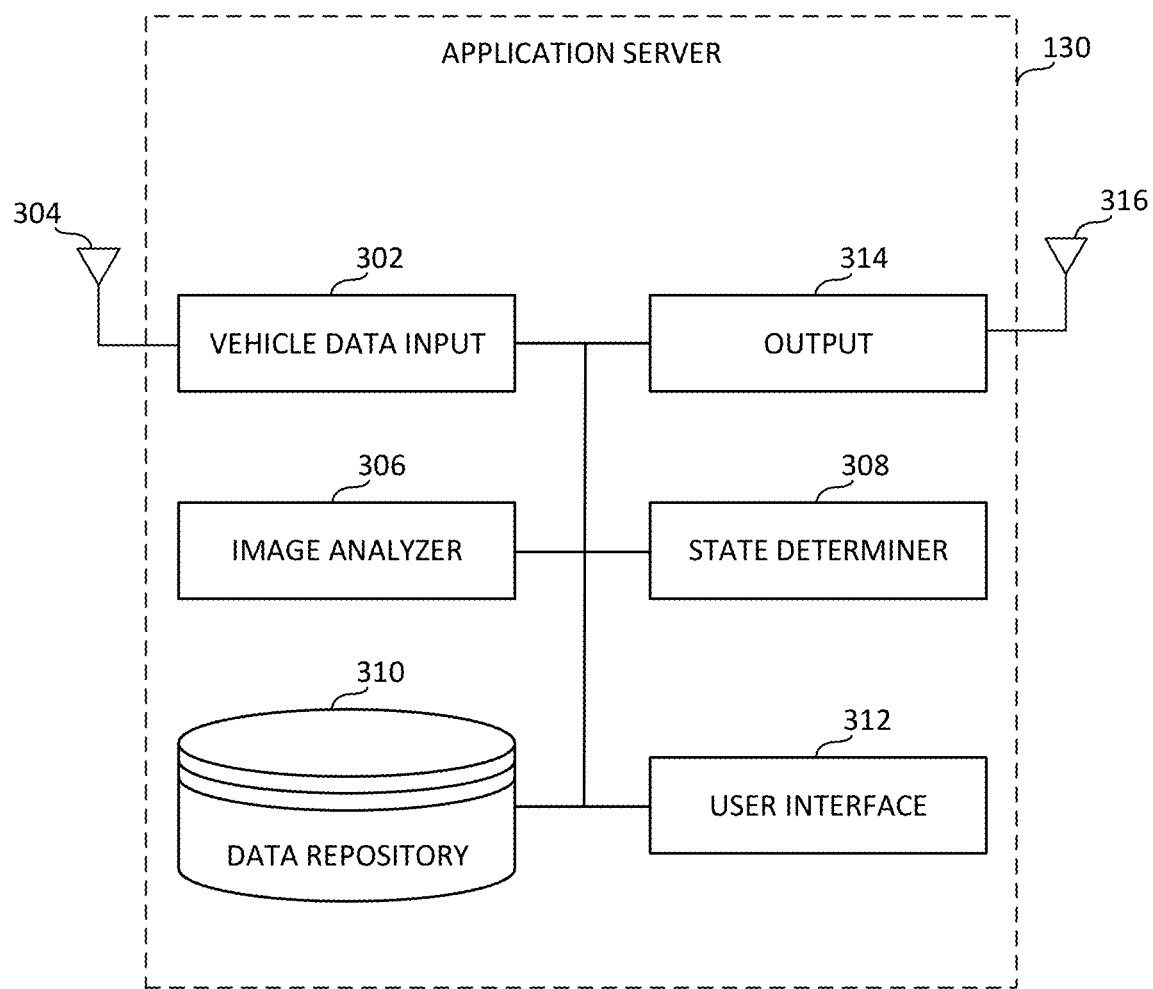
FIG. 3 illustrates further detail regarding an implementation of the example application server of FIG. 1

FIG. 3 illustrates further detail regarding an implementation of the example application server 130 of FIG. 1. In the illustrated example of FIG. 3, the application server 130 includes an example vehicle data input 302 with an example interface 304, an example image analyzer 306, an example state determiner 308, an example data repository 310, an example user interface 312, and an example mobile device output 314 with an example interface 316. However, other example implementations of the application server 130 may include fewer or additional structures to process information to analyze and qualify vehicle (and associated driver) behavior in accordance with the teachings of this disclosure.

In the illustrated example of FIG. 3, the example vehicle data input 302 collects, acquires and/or receives one or more inputs from the mobile device 108 via the interface 304 such as vehicle 102 location information, time information, speed information, image data, image data analysis, vehicle/operator state information, etc. The example interface 304 can include an antenna, a wireless communication interface, a wired communication interface, etc. Data identified and/or derived from the signal(s) collected and/or received by the example vehicle data input 302 may be stored in a computer-readable storage medium such as the example data repository 310 described below. Received information can also be displayed via the example user interface 312 (e.g., a display screen, liquid crystal display (LCD), light emitting diode (LED), touchscreen display, etc.) of the example application server 130, for example.

In the illustrated example of FIG. 3, the example image analyzer 306 receives image data (e.g., video footage, still images, etc.) and/or image analysis via the vehicle data input 302. As discussed above, in some examples, the image analyzer 216 of the example mobile device 108 processes the video and/or still image data to identify objects and relationships in the image data, and the identified objects and relationships are provided to the image analyzer 306 of the example application server 130. In other examples, the image analyzer 306 received the video and/or still image data sent from the mobile device 108 and processes the image data itself at the application server 130.

For example, one or more machine learning techniques such as an artificial neural network (also referred to as a neural network), other pattern recognition, etc., can be applied by the image analyzer 306 to the image data to identify objects and/or other features in the image data. An artificial neural network can be implemented by the image analyzer 306 in a variety of ways. Neural networks and/or other machine learning methods can be used to identify features in the image data, a task which is otherwise difficult using rules-based programming.

An artificial neural network is first trained based on known or reference data. Training can involve tuning weights for various elements or nodes in the network using the known, predetermined, or reference data (e.g., image data in which identification and location of objects and/or other features in the image is already known). The trained neural network can then be used on additional image data to analyze and identify features of interest (e.g., stop signs, traffic lights, vehicles, pedestrians, cross-walks, etc.). The artificial neural network can leverage information from the data repository 310 and/or from the mobile device 108, for example, to assist in training and implementing the neural network. The artificial neural network can store network weights and/or other configuration information in the data repository 310, for example. In certain examples, once the application server 130 has trained the neural network, the neural network can be deployed locally, via the output 314 and interface 316, for execution by the image analyzer 216 at one or more mobile devices 108.

As described above with respect to FIG. 2, the example artificial neural network can be implemented in a variety of ways including with principal component analysis, independent component analysis, cascade learning, etc. For example, an artificial neural network with independent component analysis can be used to isolate features in an image (e.g., facial recognition, sign recognition, other object recognition, etc.). Using independent component analysis (also known as blind source separation), a set of independent components is sought from a combination of elements. That is, individual objects or features are sought amongst a plurality of image data (e.g., from dashboard camera footage, etc.). In independent component analysis, two components or features are considered independent if knowledge of one component implies nothing about the other component. Independent component analysis can be used by an artificial neural network to analyze data points (e.g., pixels, voxels, etc.) in the image data and organize related data points (e.g., by color, by proximity, by identified boundary, etc.) into objects or features in the image data.

Weights (also referred to as network weights or neural network weights) can be determined based on data point values and arrangements identified in analyzed image data. For example, an initial set of weights can be determined by neural network analysis of image data during a network training phase. One or more of the weights can be modified by values, patterns, etc., analyzed during an operational phase of the artificial neural network, for example.

In certain examples, using cascade learning (also referred to as cascading learning or cascade correlation), involves beginning with a minimal network of nodes (also referred to as neurons or units), which then automatically trains and expands the network to add new "hidden" nodes, resulting in a multi-layered structure. Once a new hidden node has been added to the network, its input-side weights are frozen. The unit then becomes a feature-detector in the network, available for producing outputs or for creating other, more complex feature detectors. Using cascade learning, the neural network can determine its own size and topology and retains the structures it has built even if its training set changes, for example. Cascade learning can be used by the artificial neural network to evaluate portions of the image data for object/feature detection, for example.

In certain examples, the artificial neural network can employ both independent component analysis and cascade learning to target relevant features in the image data (e.g., within the dashboard camera or "dash-cam" footage). The feature transformation technique of independent component analysis combined with cascade learning allows the neural network to isolate local features within an image.

The artificial neural network (or an array of artificial neural networks) is trained to target a set of important objects (e.g., stop signs, traffic lights, car bumpers, pedestrians, crosswalks, obstacles, etc.). Once these objects are identified in the image data, the image analyzer 306 applies geometry to calculate distance (e.g., distance between identified objects in the image data, distance between an object and the vehicle 102, etc.).

In the illustrated example of FIG. 3, the example state determiner 308 receives information from one or more of the vehicle data input 302, the image analyzer 306, the data repository 310, and the user interface 312 to determine an operating state of the vehicle 102 (and/or its driver). Available data from these sources is combined by the state determiner 308 to evaluate a quality of driving and/or other operational state associated with the vehicle.

For example, the state determiner 308 combines data from the above sources (e.g., the example vehicle data input 302, image analyzer 306, data repository 310, user interface 312, etc.), when available, to determine an operating state of the vehicle 102 and/or its operator/driver. An operator's quality of driving can be quantified based on a plurality of driving events identified and evaluated using data from the available sources. Driving events can include stop signs, traffic lights, vehicle speed, turn signal usage, cornering g-force, lane centering (e.g., how well the vehicle 102 stays in its lane), lead car proximity (e.g., a measure of tailgating), etc. The data repository 310 can include one or more rules regarding driving norms, driving laws, expected reactions, etc., to be used in comparison to obtained data to evaluate vehicle/ operator 102 behavior.

The state determiner 308 generates a score or set of scores for the driver of the vehicle and provides a summary with an overall score for driver behavior, as well as an individual breakdown for each metric via the user interface 222 of the mobile device. Such information can also be stored in the data repository 220 for continued monitoring, trending, and/or use in further metric analysis, for example.

While an example manner of implementing the example mobile device 108 of FIG. 1 is illustrated in FIG. 2, one or more of the elements, processes and/or devices illustrated in FIG. 2 may be combined, divided, re-arranged, omitted, eliminated and/or implemented in any other way. Further, the example GPS receiver 202, the example radio receiver 206, the example radio transmitter 210, the example speedometer 214, the example image analyzer 216, the example state determiner 218, the example data repository 220, the example user interface 222 and/or, more generally, the example mobile device 108 of FIG. 2 may be implemented by hardware, software, firmware and/or any combination of hardware, software and/or firmware. Thus, for example, any of the example GPS receiver 202, the example radio receiver 206, the example radio transmitter 210, the example speedometer 214, the example image analyzer 216, the example state determiner 218, the example data repository 220, the example user interface 222 and/or, more generally, the example mobile device 108, can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example GPS receiver 202, the example radio receiver 206, the example radio transmitter 210, the example speedometer 214, the example image analyzer 216, the example state determiner 218, the example data repository 220, the example user interface 222 and/or, more generally, the example mobile device 108 is/are hereby expressly defined to include a tangible computer readable storage device or storage disk such as a memory, a digital versatile disk (DVD), a compact disk (CD), a Blu-ray disk, etc., storing the software and/or firmware. Further still, the example mobile device 108 of FIG. 2 may include one or more elements, processes and/or devices in addition to, or instead of, those illustrated in FIG. 2, and/or may include more than one of any or all of the illustrated elements, processes and devices.

Additionally, while an example manner of implementing the example application server 130 of FIG. 1 is illustrated in FIG. 3, one or more of the elements, processes and/or devices illustrated in FIG. 3 may be combined, divided, re-arranged, omitted, eliminated and/or implemented in any other way. Further, the example vehicle data input 302, the example image analyzer 306, the example state determiner 308, the example data repository 310, the example user interface 312, and the example mobile device output 314 and/or, more generally, the example application server 130 of FIG. 3 may be implemented by hardware, software, firmware and/or any combination of hardware, software and/or firmware. Thus, for example, any of the example vehicle data input 302, the example image analyzer 306, the example state determiner 308, the example data repository 310, the example user interface 312, and the example mobile device output 314 and/or, more generally, the example application server 130 can be implemented by one or more analog or digital circuit(s), logic circuits, programmable processor(s), application specific integrated circuit(s) (ASIC (s)), programmable logic device(s) (PLD(s)) and/or field programmable logic device(s) (FPLD(s)). When reading any of the apparatus or system claims of this patent to cover a purely software and/or firmware implementation, at least one of the example vehicle data input 302, the example image analyzer 306, the example state determiner 308, the example data repository 310, the example user interface 312, and the example mobile device output 314 and/or, more generally, the example application server 130 is/are hereby expressly defined to include a tangible computer readable storage device or storage disk such as a memory, a digital versatile disk (DVD), a compact disk (CD), a Blu-ray disk, etc., storing the software and/or firmware. Further still, the example application server 130 of FIG. 3 may include one or more elements, processes and/or devices in addition to, or instead of, those illustrated in FIG. 3, and/or may include more than one of any or all of the illustrated elements, processes and devices.

Flowcharts representative of example machine-readable instructions for implementing the example mobile device 108, the application server 130, and/or the environment 100 of FIGS. 1-3 are shown in FIGS. 4-6 and 8. In these examples, the machine-readable instructions comprise one or more program(s) for execution by a processor such as the processor 1112 shown in the example processor platform 1100 discussed below in connection with FIG. 11. The one or more program(s) may be embodied in software stored on a tangible computer readable storage medium such as a CD-ROM, a floppy disk, a hard drive, a digital versatile disk (DVD), a Blu-ray disk, or a memory associated with the processor 1112, but the entire program(s) and/or parts thereof could alternatively be executed by a device other than the processor 1112 and/or embodied in firmware or dedicated hardware. Further, although the example program (s) is/are described with reference to the flowcharts illustrated in FIGS. 4-6 and 8, many other methods of implementing the example mobile device 108, application server 130, and/or environment 100 may alternatively be used. For example, the order of execution of the blocks may be changed, and/or some of the blocks described may be changed, eliminated, or combined.

As mentioned above, the example processes of FIGS. 4-6 and 8 may be implemented using coded instructions (e.g., computer and/or machine-readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term "tangible computer readable storage medium" is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-6 and 8 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer readable medium" is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 4:
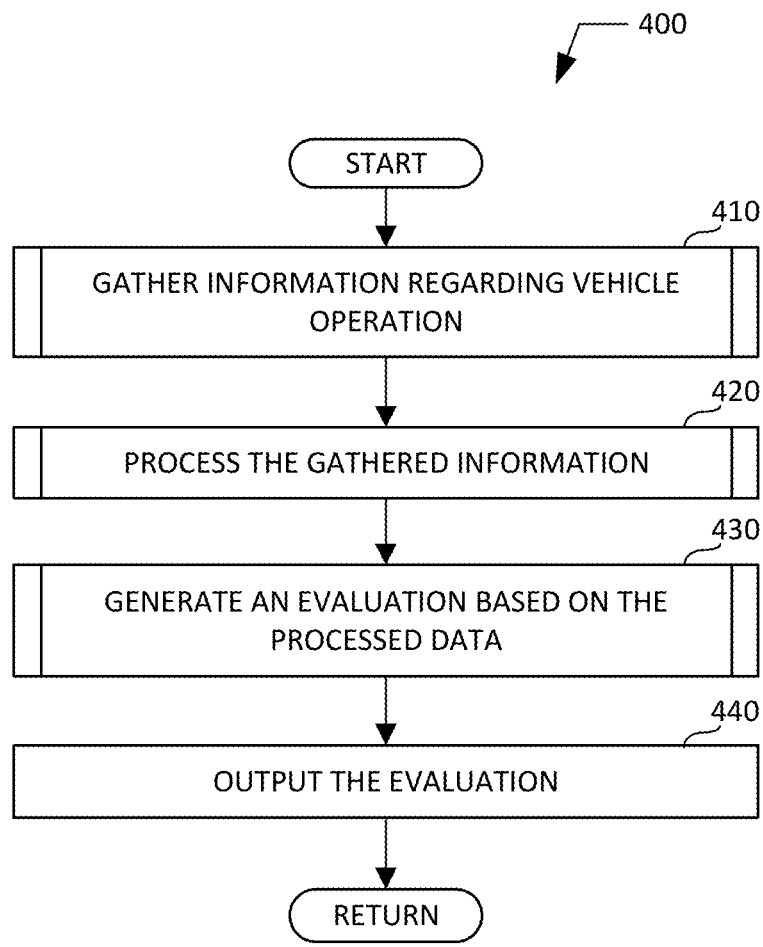
FIG. 4 illustrates a flowchart representative of example machine-readable instructions that can be executed to implement an example data collection environment FIGS. 1-3 to generate an analysis of vehicle operator behavior.

FIG. 4 is a flowchart representative of example machine-readable instructions 400 that may be executed to implement the example data collection environment 100 including the example mobile device 108 of FIGS. 1-2 and the example application server 130 of FIGS. 1 and 3 to generate an analysis of vehicle operator behavior. At block 410, environmental information regarding vehicle 102 operation is gathered by the example mobile device 108 and/or application server 130. For example, vehicle 102 location, time, speed, cornering, distance between adjacent cars, movement and/or other patterns indicating observance of laws, etc., are gathered and/or otherwise collected by one or more sensors in or in view of the vehicle 102.

For example, the example GPS receiver 202 can collect, acquire and/or receive one or more signals from one or more GPS satellites (e.g., the GPS satellite 118 of FIG. 1) regarding vehicle 102 location, as described above, including information from which the current time can be identified and/or derived. The example radio receiver 206 can also collect, acquire and/or receive one or more cellular and/or Wi-Fi® signals from one or more cellular base stations (e.g., the example cellular base stations 110, 112, 114 of FIG. 1) and/or one or more wireless access points (e.g., the example wireless access point 116 of FIG. 1), as described above, including information that can be used to identify the location of the mobile device 108 at a given time. The example image analyzer 216 can also receive image data (e.g., video footage, still images, etc.) from an external camera, such as a dashboard camera, (e.g., via the radio receiver 206) and/or from a camera integrated with the mobile device 108 (not shown), as described above with respect to FIG. 2.

At block 420, the gathered environmental data is processed. For example, change in geographic location and elapsed time information can be combined to determine vehicle 102 speed. Image data can be analyzed to identify objects/features in the still and/or video image data as well as distance between each identified object and the vehicle 102. A neural network and/or other machine learning can be implemented and trained for ongoing data analysis, for example.

At block 430, a score, profile, and/or other evaluation is generated based on the processed data. For example, a driver risk assessment, performance assessment, compliance assessment, etc., can be computed by evaluating one or more factors including vehicle 102 speed in comparison with posted speed limit, compliance with stop signs and stop lights, cornering speed, distance maintained between adjacent vehicles, turn signal usage, acceleration, staying in lane, etc.

At block 440, the evaluation is output. For example, a report including the vehicle and/or operator assessment/ evaluation can be output to the operator and/or other recipient (e.g., insurance company, car rental company, car manufacturer, law enforcement agency, etc.) in printed form, electronically, etc.

Figure 5:
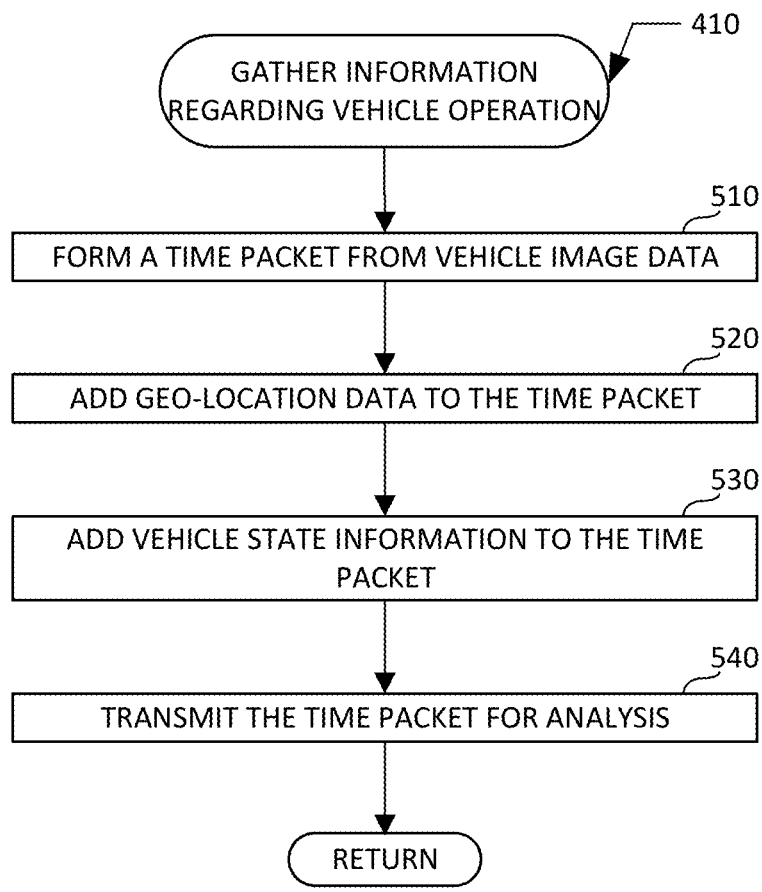
FIG. 5 is a flowchart providing further example detail for a portion of the process of FIG. 4 to gather information regarding vehicle operation.

FIG. 5 is a flowchart representative of example machine-readable instructions that may be executed to implement block 410 of FIG. 4 to gather information regarding vehicle operation. At block 510, a time packet is formed from image data captured with respect to the vehicle 102. For example, dashboard camera footage is streamed into the data repository 220, and a time packet is formed from the camera footage in the repository 220. The time packet is a dynamic data representation of vehicle/operator behavior classified by data type (e.g., image data, etc.) and time (e.g., image data time stamp, etc.), for example.

At block 520, geo-location data is added to the time packet. For example, geo-location data can be received from one or more cellular base stations 110, 112, 114, wireless access point(s) 116, and GPS satellite(s) 118. For example, the GPS and/or radio receivers 202, 206 of the example mobile device 108 may implement an Assisted GPS (A-GPS) process and/or Location Based Services (LBS) based on received location information and add geo-location data to the time packet.

At block 530, vehicle state information is added to the time packet. For example, speed information for the vehicle 102 is obtained from the speedometer 214 directly from the vehicle 102 and/or determined based on geo-location and time location from one or more cellular base stations 110, 112, 114, wireless access point(s) 116, and GPS satellite(s) 118. Thus, the time packet can be formed from the image data, geo-location data, and vehicle state information.

At block 540, the time packet is transmitted for analysis. The time packet can be analyzed locally by the mobile device 108, for example, and/or may be sent to the application server 130 for analysis, for example. In certain examples, additional information (e.g., cornering, distance between adjacent cars, movement and/or other patterns indicating observance of laws, etc.) can be gathered and transmitted with the time packet as well. In certain examples, time packets are streamed for analysis as they become available. In other examples, time packets are accumulated and provided periodically and/or on request for analysis.

Figure 6:
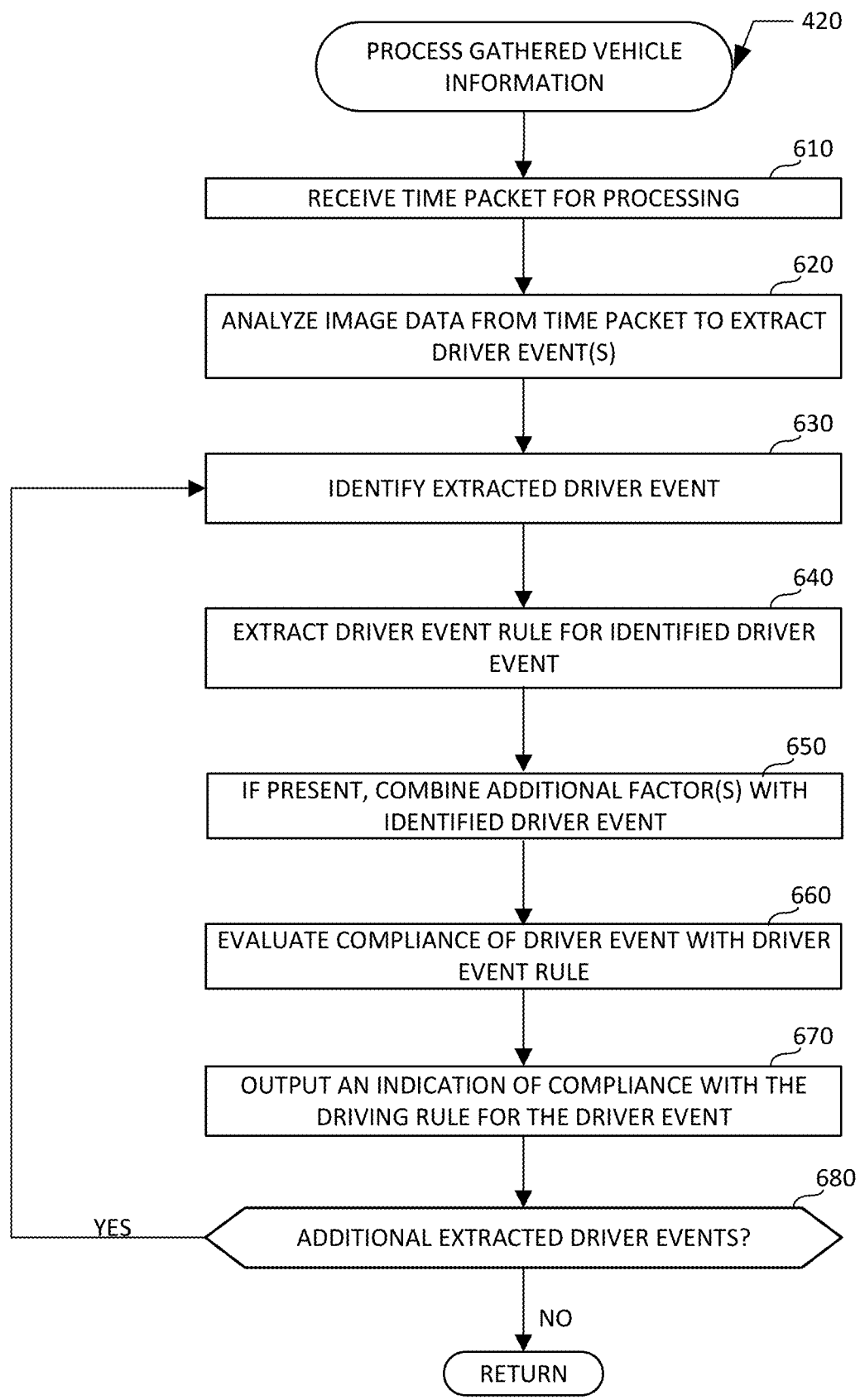
FIG. 6 is a flowchart providing further example detail for a portion of the process of FIG. 4 to process gathered information regarding vehicle operation.

FIG. 6 is a flowchart representative of example machine-readable instructions that may be executed to implement block 420 of FIG. 4 to process the gathered information regarding the vehicle 102 operation. At block 610, the time packet is received for processing by the mobile device 108 and/or the application server 130.

At block 620, image data from the time packet is analyzed to extract driver event(s). For example, still and/or video image data is analyzed to identify one or more driver events such as stop signs, stop lights, other traffic indicators, near or adjacent cars, lane markers, etc. Patterns and objects can be recognized in the image data, and pattern matching can be used to identify when events are occurring (e.g., the vehicle 102 is stopping at a stop light, the vehicle 102 is rolling through a stop sign, the vehicle 102 is driving too close to the vehicle in front of it, etc.).

For example, a neural network and/or other machine learning can be implemented and trained to analyze the image data and extract driver event(s). For example, one or more machine learning techniques such as an artificial neural network (also referred to as a neural network), other pattern recognition, etc., can be applied by the example image analyzer 216 and/or the example image analyzer 306 to the image data to identify objects and/or other features (also referred to as driver events) in the image data. In certain examples, the image analyzer 216 forms the artificial neural network locally to the mobile device 108. In other examples, the image analyzer 216 communicates with an external device, such as the example application server 130, which implements the artificial neural network via the image analyzer 306. Neural networks and/or other machine learning methods can be used to identify driver events in the image data, a task which is otherwise difficult using rules-based programming.

An artificial neural network is first trained based on known or reference data. Training can involve tuning weights for various elements or nodes in the network using the known, predetermined, or reference data (e.g., image data in which identification and location of objects and/or other features in the image is already known). The trained neural network can then be used on additional image data to analyze and identify driver events of interest (e.g., stop signs, traffic lights, vehicles, lane markers, corners, intersections, pedestrians, cross-walks, etc.).

The example artificial neural network can be implemented in a variety of ways including with principal component analysis, independent component analysis, cascade learning, etc. For example, an artificial neural network with independent component analysis can be used to isolate features representing driver events in an image (e.g., facial recognition, sign recognition, other object recognition, etc.). Using independent component analysis (also known as blind source separation), a set of independent components is sought from a combination of elements. That is, individual objects or features are sought among a plurality of image data (e.g., from dashboard camera footage, etc.). In independent component analysis, two components or features are considered independent if knowledge of one component implies nothing about the other component. Independent component analysis can be used by an artificial neural network to analyze data points (e.g., pixels, voxels, etc.) in the image data and organize related data points (e.g., by color, by proximity, by identified boundary, etc.) into objects or features in the image data.

Weights (also referred to as network weights or neural network weights) can be determined based on data point values and arrangements identified in analyzed image data. For example, an initial set of weights can be determined by neural network analysis of image data during a network training phase. One or more of the weights can be modified by values, patterns, etc., analyzed during an operational phase of the artificial neural network, for example.

In certain examples, using cascade learning (also referred to as cascading learning or cascade correlation), involves beginning with a minimal network of nodes (also referred to as neurons or units), which then automatically trains and expands the network to add new "hidden" nodes, resulting in a multi-layered structure. Once a new hidden node has been added to the network, its input-side weights are frozen. The unit then becomes a feature-detector in the network, available for producing outputs or for creating other, more complex feature detectors. Using cascade learning, the neural network can determine its own size and topology and retains the structures it has built even if its training set changes, for example. Cascade learning can be used by the artificial neural network to evaluate portions of the image data for object/feature detection, for example.

In certain examples, the artificial neural network can employ both independent component analysis and cascade learning to target relevant features in the image data (e.g., within the dashboard camera or "dash-cam" footage). The feature transformation technique of independent component analysis combined with cascade learning allows the neural network to isolate local features within an image.

Thus, for example, network weights can be tuned based on prior experience (e.g., showing images to the neural network to establish driver event archetypes and then tune those driver event archetypes based on collected prior driver experiences or norms, etc.). Then, the neural network can be activated with the tuned weights and trained on test data from someone driving a vehicle (e.g., the vehicle 102) to show the neural network different driver events (e.g., stopping at a stop light, running through a stop sign, yielding to oncoming traffic, turning left into oncoming traffic, slowing down before a turn, turning too fast, etc.) so that the neural network can learn the driver events and distinguish between positive and negative driver events based on the pre-tuned weights and driver event rules.

In certain examples, geo-location information can also be used to help the neural network reason in its identification of driver events using logic based on location as well as driver event description. For example, a stop sign would not be expected in the middle of a road with no intersection. However, a stop sign would be expected at a four-way intersection, for example. Thus, the neural network is trained to identify particular patterns at particular times in particular locations, not just looking for all patterns at all times, for example.

Then, once the neural network has learned how to operate, the neural network can be put into operation locally, distributed by the example application server 130 among one or more mobile devices 108, running remotely from the "cloud" via the application server 130, etc. In certain examples, a local neural network running on the mobile device 108 can receive updates from a cloud and/or centralized neural network maintained by the application server 130. In certain examples, localized neural networks running on a plurality of mobile devices 108 in a plurality of vehicles 102 can learn from each other (e.g., exchanging updates, driver event experiences, and/or other messages via the application server 130, etc.).

At block 630, for each extracted driver event, the driver event is identified (e.g., stop sign, stop light, adjacent car, lane marker, street corner, intersection, etc.). For example, the artificial neural network (or an array of artificial neural networks at an external device such as the example application server 130, etc.) is trained to target a driver events based on preset and/or learned driver event definitions, rules, etc. (e.g., stop signs, traffic lights, car bumpers, pedestrians, crosswalks, corners, intersections, obstacles, etc.). Once these events are isolated and/or otherwise extracted in the image data, the driver events are identified by associating each event with a name, type, category, classification, and/or other identifier.

Figure 7:
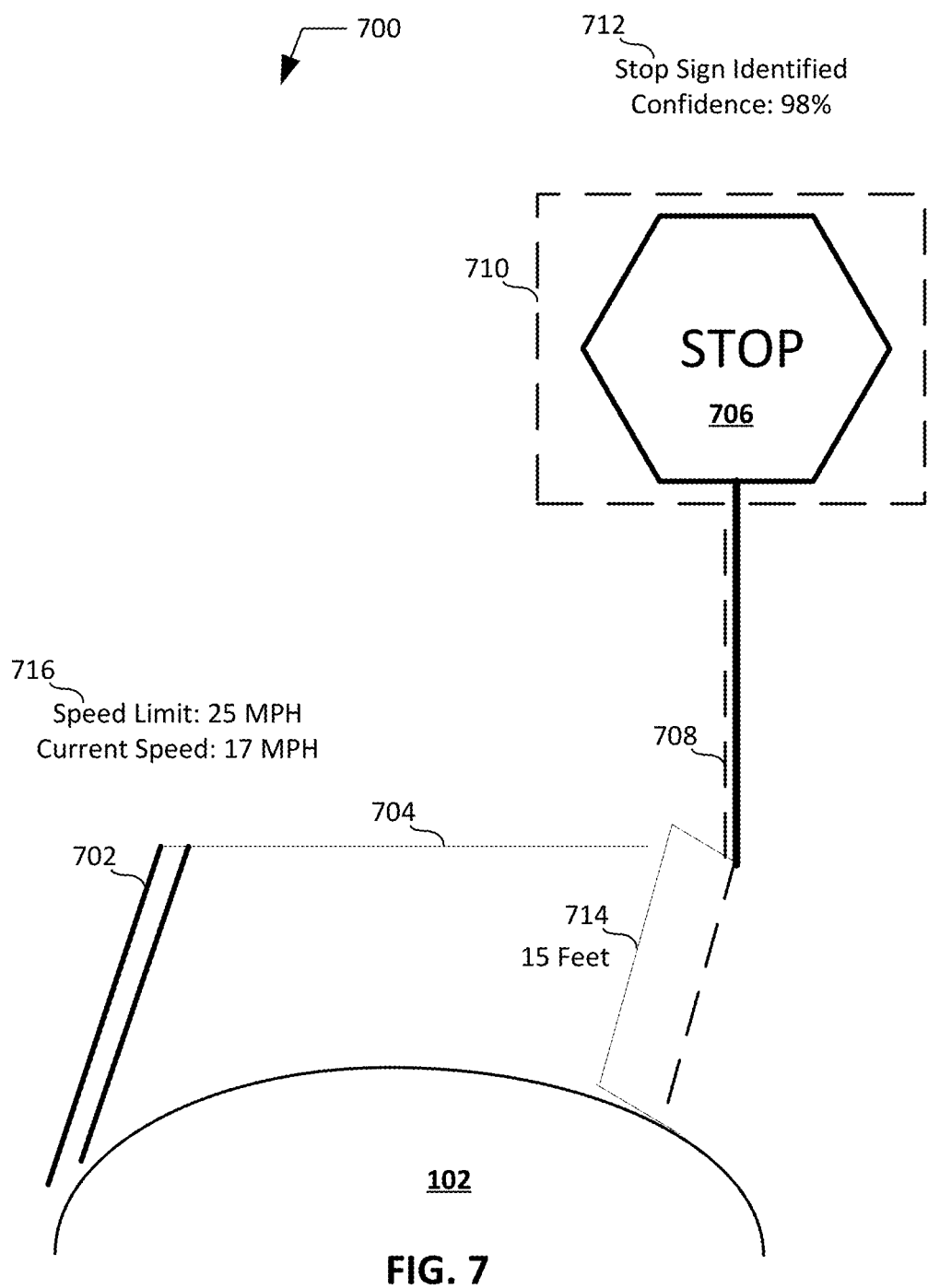
FIG. 7 illustrates an example analyzed image including a plurality of driver events identified in the image.

FIG. 7 illustrates an example analyzed image 700 including a plurality of driver events 702, 704, 706 identified in the image 700. As shown in the example image 700, the neural network identified three driver events 702, 704, 706 in the image data (e.g., a screenshot from dashboard camera video footage). For example, a lane marker 702 is identified as a driver event in the image data 700 and can be used to evaluate whether the vehicle 102 stays in its lane. An intersection marker 704 is also identified as a driver event in the image data 700 and can be used to evaluate whether the vehicle 102 slows as it approaches the intersection and whether the vehicle 102 stops at the intersection, for example. A stop sign 706 is also identified as a driver event in the image data 700 and can be used to evaluate whether the vehicle 102 stops for the stop sign 706 or not.

As shown in the example of FIG. 7, the stop sign 706 is extracted from the image data 700 and identified by the neural network through recognition of a post 708 and hexagonal sign 710 having certain coloring and lettering recognizable by the neural network as a traffic sign and, more specifically, as a stop sign 706. An indication of the identification of the driver event and an associated accuracy or confidence in identification 712 can also be provided in conjunction with the identification of the stop sign 706 to provide feedback to a review, operator, neural network, etc., in making the identification from the image data 700, for example. A distance 714 can also be measured based on geo-location information regarding the vehicle 102 and geometry between the vehicle 102 and the stop sign 706. A speed and speed limit 716 can also be determined and noted for the vehicle 102 in the example image 700.

At block 640, based on the identification of the driver event, a rule is extracted for vehicle behavior with respect to the driver event. For example, an expected, normal, reference, or legal behavior (and/or a contrast to unexpected or illegal behavior) can be defined as a rule that can be identified in a data store of rules (e.g., stored in the example data repository 220 and/or data repository 310, etc.). Driver event rules can include stopping at a stop sign or red stop light, slowing down at a yield sign or yellow light, slowing down and using a turn signal before making a turn, leaving two car lengths between the vehicle 102 and a vehicle in front, etc.

At block 650, one or more additional factors can be combined with the identified driver events and driver event rules. For example, a distance between the identified driver event and the vehicle 102 is determined based on geo-location information (e.g., distance between the vehicle 102 and a stop sign, change in distance over time between the vehicle 102 and an intersection, etc.). Vehicle 102 speed can also be considered when evaluating identified driver events with respect to driver event rules. For example, a speed at which the vehicle 102 is approaching a traffic light and/or a change in speed over a time interval at which the vehicle 102 approaches a traffic light, etc., can also be identified.

At block 660, compliance with a driver event rule is evaluated based on one or more elements in the identified information including driver event(s) from the image data, geo-location information, and/or speed, etc. Compliance with a driver rule can be evaluated by comparing identified driver events, alone or in conjunction with geo-location, speed, and/or other identified information, over a plurality of points in time to determine how distance and/or speed changes, for example. For example, a stop sign can be identified as a driver event in the image data, and vehicle 102 speed can also be identified and tracked to determine whether the vehicle 102 slows down and stops at the stop sign.

For example, as shown in FIG. 7, the indication of current speed and speed limit 716 can be evaluated to: 1) determine whether the vehicle 102 is traveling within the specified speed limit and 2) determine whether the vehicle 102 is slowing down as it approaches the stop sign 706 to come to a stop at the stop sign 706 before continuing through the intersection. Such data can be evaluated in a snap shot and/or over time, for example.

At block 670, an indication of compliance is output. For example, data used to generate an assessment (e.g., a stop sign 706 assessment, etc.) and/or other data indicating whether identified driver events are in compliance with driver event rules for the vehicle 102 can be output for display, further processing, etc.

At block 680, if additional driver events have been extracted from the image data of the time packet, control returns to block 630 to identify the next extracted driver event. However, if all extracted driver events have been identified and evaluated, control returns to the process 400.

Figure 8:
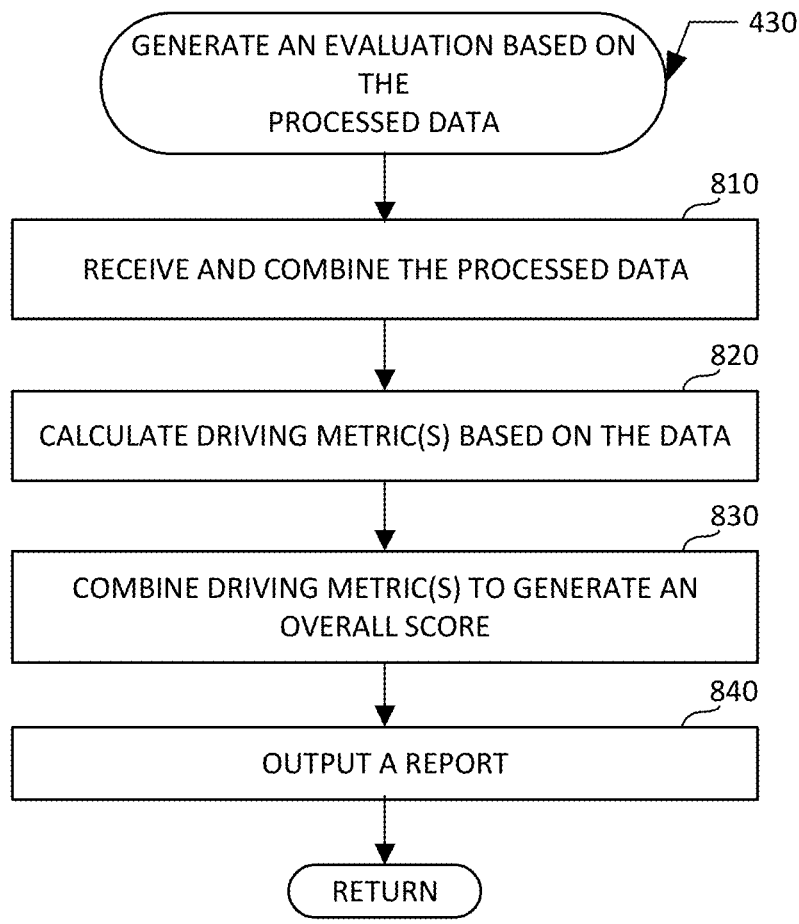
FIG. 8 is a flowchart providing further example detail for a portion of the process of FIG. 4 to generate an evaluation based on the processed data.

FIG. 8 is a flowchart representative of example machine-readable instructions that may be executed to implement block 430 of FIG. 4 to generate an evaluation based on the processed data. At block 810, the processed data is received and combined. For example, driver event data, compliance information, and/or other information such as speed, g-force, and/or other car sensor information is received and combined. Geo-location and/or other sensor data (speed, time, g-force, etc.) can be used to flag driver events from among the identified and processed driver events to determine which driver events are relevant to a driver quality calculation, for example. Thus, car sensor information, geo-location, and machine learning from acquired image data can be used to generate an evaluation of operator behavior/driving quality.

At block 820, one or more driving metrics are calculated based on the combined, processed data. For example, one or more driving metrics can include a) compliance with stop signs, b) compliance with traffic lights, c) compliance speed limits, d) turn signal usage, e) cornering g-force, f) lane centering, and/or g) lead car proximity.

Figure 9:
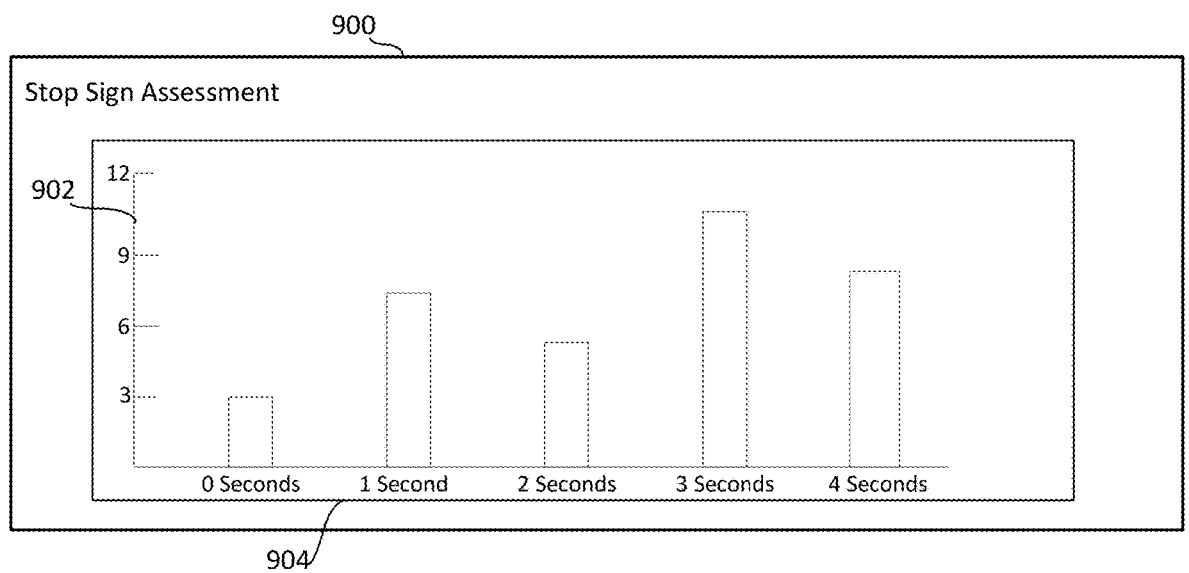
FIG. 9 illustrates an example stop sign assessment.

For example, on approach to a stop sign 706, the stop sign object 706 is identified from the video feed from the dash-cam. Distance and car speed are also monitored to determine if the driver came to a complete stop, rolled through the stop sign, or ran the stop sign. The driver's behavior at this stop sign event is added to other stop sign events, and an average stop sign metric can be calculated over a given time period. FIG. 9 illustrates an example stop sign assessment 900 indicating a number of times 902 the vehicle stopped at a stop sign and a length of time 904 for which the vehicle was stopped at the stop sign before continuing. Similar assessments can be generated for the other metrics and aggregated over time as well.

Figure 10:
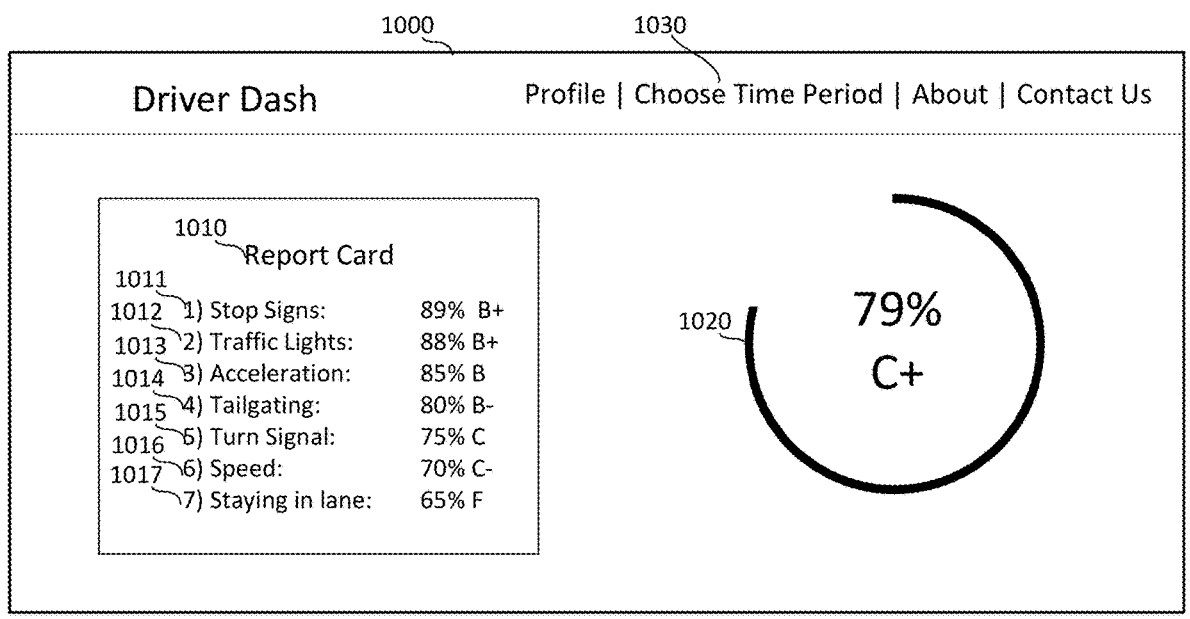
FIG. 10 illustrates a driver evaluation report.

At block 830, driving metrics can be combined to generate an overall evaluation or score for the vehicle operator. For example, as shown in an example driver report 1000 of FIG. 10, a report card 1010 includes a plurality of metric assessments 1011-1017 including stop signs 1011, traffic lights 1012, acceleration 1013, tailgating 1014, turn signal 1015, speed 1016, and staying in lane 1017. The metrics 1011-1017 in the report card 1010 can be combined (e.g., averaged) to form a composite or overall score for the vehicle operator, such as the overall score 1020 illustrated in the example of FIG. 10. As shown in the example scorecard 1000, the overall score 1020 can be represented in one or more of a plurality of formats including a numeric format (e.g., a value or percentage (e.g., 79%), a ranking or "grade" (e.g., C+), a graphical indicator (e.g., an arc or partially formed circle as in the example of FIG. 10 to indicate a roughly 80% compliance), etc. The overall or composite score 1020 provides a snapshot or overall evaluation, while the individual metric scores 1011-1017 highlight areas for improvement, for example. A menu or set of options 1030 allows a user to view an operator profile, choose a time period for review, and/or view/set other report parameters, for example.

At block 840, the report is output. For example, the application server 130 transmits the report scorecard 1000, and/or its constituent information, to the mobile device 108 and/or one or more external devices. If the mobile device 108 generates and/or receives the report, the mobile device 108 can output the report via the user interface 222, store the report in the data repository 220, transmit the report to another recipient, etc. Areas of concern (e.g., metrics 1011-1017 falling below a legal or acceptable threshold, etc.) can be highlighted and monitored with heightened scrutiny to identify and alert to an improvement, trend, or other change (positive or negative) in operator behavior, for example. In certain examples, the mobile device 108 triggers a warning or other indication (e.g., activates a light, sound, and/or vibration to warn of an approaching stop sign or traffic light, an upcoming turn, an approaching vehicle, etc.) to help encourage improved behavior with respect to a metric 1011-1017 and its associated driver event(s). In certain examples, warning thresholds, selected metrics, specific tunable driving actions, etc. are customizable by operator, car owner, insurance company, manufacturer, law enforcement, etc. In certain examples, feedback can be provided regarding a trend over time, improvement/regression, etc., via the mobile device 108, application server 130, and/or other output.

Thus, certain examples provide a combination of geo-location, car sensor information, and machine learning image analysis to extract driver events, identify corresponding rules, and determine vehicle operator compliance with the rules based on the driver events. Car location and sensor information can help the machine learning system (e.g., the neural network) identify and learn to focus on relevant aspects of monitored data to automatically evaluate driver performance.

Figure 11:
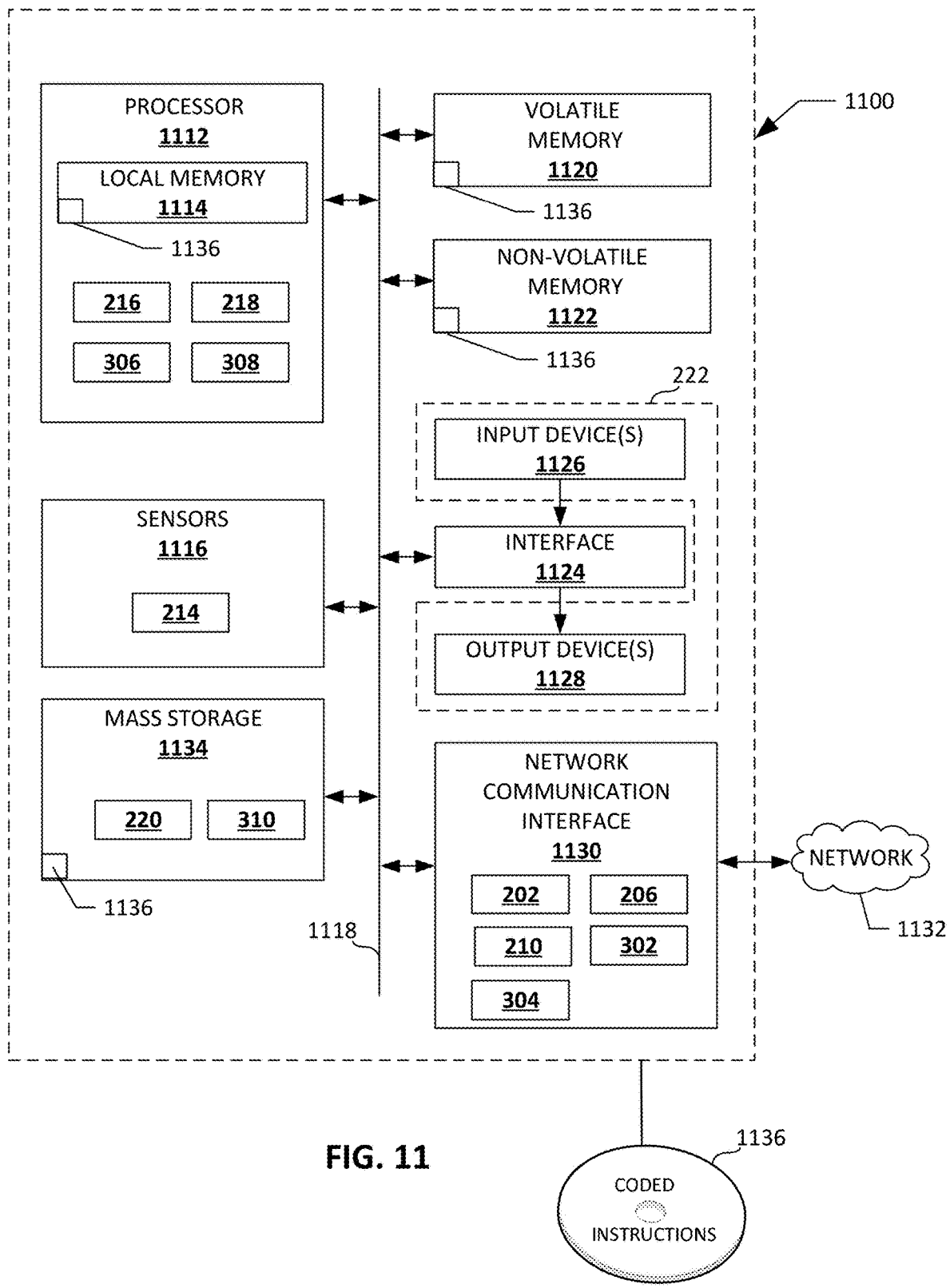
FIG. 11 is an example processor platform capable of executing the example instructions of FIGS. 4-6 and 8 to implement the example environment and devices of FIGS. 1-3, 7, and 9-10.

FIG. 11 is a block diagram of an example processor platform 1100 capable of executing the example instructions of FIGS. 4-6 and 8 to implement the example environment and devices of FIGS. 1-3, 7, and 9-10. The processor platform 1100 can be, for example, a personal computer, a tablet, a smartphone, or any other type of mobile computing device, including for example, the example mobile device 108.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The example processor 1112 includes a local memory 1114 (e.g., a cache). The example processor 1112 also includes the example image analyzer 216 and the example state determiner 218 of FIG. 2 and/or the example image analyzer 306 and example state determiner 308 of FIG. 3.

The processor 1112 of the illustrated example is in communication with one or more example sensors 1116 via a bus 1118. The example sensors 1116 include the example speedometer 214 of FIG. 2.

The processor 1112 of the illustrated example is in communication with a main memory including a volatile memory 1120 and a non-volatile memory 1122 via the bus 1118. The volatile memory 1120 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1122 may be implemented by flash memory and/or any other desired type of memory device. Access to the main memory 1120, 1122 is controlled by a memory controller.

The processor platform 1100 of the illustrated example also includes an interface circuit 1124. The interface circuit 1124 may be implemented by any type of interface standard, such as an Ethernet interface, a universal serial bus (USB), and/or a PCI express interface. In the illustrated example, one or more input devices 1126 are connected to the interface circuit 1124. The input device(s) 1126 permit(s) a user to enter data and commands into the processor 1112. The input device(s) 1126 can be implemented by, for example, a keyboard, a mouse, a touchscreen, a track-pad, a trackball, isopoint and/or a voice recognition system. One or more output devices 1128 are also connected to the interface circuit 1124 of the illustrated example. The output devices 1128 can be implemented, for example, by display devices (e.g., a liquid crystal display, a cathode ray tube display (CRT), a touchscreen and/or speakers). The interface circuit 1124 of the illustrated example, thus, typically includes a graphics driver card, a graphics driver chip or a graphics driver processor. In the illustrated example, the input device(s) 1126 and the output device(s) 1128 collectively form the example user interface 222 of FIG. 2 and/or the example user interface 312 of FIG. 3.

The processor platform 1100 of the illustrated example also includes a network communication interface circuit 1130. The network communication interface circuit 1130 may be implemented by any type of interface standard, such as an Ethernet interface, a universal serial bus (USB), and/or a PCI express interface. In the illustrated example, the network interface circuit 1130 includes the example GPS receiver 202, the example radio receiver 206 and the example radio transmitter 210 of FIG. 2 and/or the example vehicle data input 302 and output 314 of FIG. 3 to facilitate the exchange of data and/or signals with external machines (e.g., a cellular base station, a wireless access point, satellite, computing devices of any kind, etc.) via a network 1132 (e.g., a cellular network, a wireless local area network (WLAN), a GPS network, an Ethernet connection, a digital subscriber line (DSL), a telephone line, coaxial cable, etc.).

The processor platform 1100 of the illustrated example also includes one or more mass storage devices 1134 for storing software and/or data. Examples of such mass storage devices 1234 include floppy disk drives, hard drive disks, compact disk drives, Blu-ray disk drives, RAID systems, and digital versatile disk (DVD) drives. In the illustrated example, the mass storage device 1134 includes the example data repository 220 of FIG. 2 and/or the example data repository 310 of FIG. 3.

Coded instructions 1136 implementing the machine-readable instructions of FIGS. 4-6 and 8 may be stored in the local memory 1114, in the volatile memory 1120, in the non-volatile memory 1122, in the mass storage device 1134, and/or on a removable tangible computer readable storage medium such as a CD or DVD.

Thus, certain examples provide methods and apparatus to evaluate vehicle operator behavior. An example method includes processing, using a particularly programmed processor, image data obtained with respect to a vehicle to identify an object in the image data. The example method includes measuring, using the mobile device, a geographic location of the vehicle. The example method includes determining, using the mobile device, an operating state of the vehicle. The example method includes analyzing the object in the image data, the geographic location, and the operating state of the vehicle to determine a behavior of the vehicle. The example method includes generating a score for a driver associated with the vehicle by comparing the behavior of the vehicle with a normal behavior (also referred to as a reference behavior), the reference behavior quantified by one or more driving metrics. The example method includes outputting the score.

From the foregoing, it will be appreciated that the disclosed methods and apparatus advantageously provide monitoring and insight into vehicle operator behavior on a vehicle-by-vehicle basis. The disclosed methods and apparatus advantageously provide an infrastructure for individual vehicle monitoring and "cloud-based" or remote aggregation and monitoring of vehicle activity. For example, a neural network can be developed, trained, and tested and dynamically deployed to vehicles for monitoring and analysis.

From the foregoing, it will also be appreciated that the aforementioned advantages may be provided in conjunction with one or more data collection, analytics, and monitoring processes disclosed herein that facilitate improved operator behavior, compliance, and safety in vehicles. The improved behavior, compliance, and safety may be of particular importance for new drivers, insurance companies, law enforcement, and vehicle design.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for vehicle operation analysis comprising:
   at least one processor; and
   memory including machine readable instructions that, when executed, cause the at least one processor to at least:
   process image data obtained by a camera showing an environment including a) at least a portion of a vehicle and b) a traffic sign external to and in proximity to the vehicle and wherein processing the image data includes isolating features in the image data to identify the traffic sign in relation to the vehicle based on at least one of a shape, color, or content of the traffic sign;
   identify a driver event using a pattern of objects including the traffic sign and the vehicle in the image data, the driver event involving the traffic sign and associated with a driver event rule specifying a reference vehicle operating behavior for the driver event, the reference vehicle operating behavior including observance of the traffic sign;
   evaluate compliance with the driver event rule for the driver event by at least:
   a) calculating a proximity of the traffic sign to the vehicle based on i) a distance between the vehicle and the traffic sign and ii) an operating state of the vehicle, the distance determined using a geographic location of the vehicle and a geometry between the vehicle and the traffic sign extracted from the image data;
   b) comparing the proximity of the traffic sign and the operating state of the vehicle to determine an actual vehicle operating behavior; and
   c) generating a score associated with operation of the vehicle by comparing the actual vehicle operating behavior with the reference vehicle operating behavior; and
   output the score to quantify an evaluation of the actual vehicle operating behavior.

2. The apparatus of claim 1, wherein the apparatus includes a cloud-based server, and wherein the instructions, when executed, cause the at least one processor to exchange driver events among a plurality of mobile devices.

3. The apparatus of claim 1, wherein the instructions, when executed, cause the at least one processor to implement an artificial neural network to process the image data with independent component analysis to identify the traffic sign in the image data.

4. The apparatus of claim 1, wherein the instructions, when executed, cause the at least one processor to implement an artificial neural network to process the image data with cascade learning to identify the traffic sign in the image data.

5. The apparatus of claim 1, wherein the traffic sign is a stop sign.

6. The apparatus of claim 1, wherein the operating state includes a speed of the vehicle.

7. The apparatus of claim 1, wherein the instructions, when executed, cause the at least one processor to evaluate compliance with the driver event rule using one or more driving metrics including at least one of: a) compliance with stop signs, b) compliance with traffic lights, c) compliance with speed limits, d) turn signal usage, e) cornering g-force, f) lane centering, or g) lead car proximity.

8. The apparatus of claim 7, wherein the instructions, when executed, cause the at least one processor to generate a profile with the score, the score forming part of the profile including an overall score and one or more driving metric scores for at least one vehicle operator.

9. At least one tangible computer-readable storage medium comprising instructions which, when executed, analyze vehicle operation by causing at least one processor to at least:
  process image data obtained by a camera showing an environment including a) at least a portion of a vehicle and b) a traffic sign external to and in proximity to the vehicle and wherein processing the image data includes isolating features in the image data to identify the traffic sign in relation to the vehicle based on at least one of a shape, color, or content of the traffic sign;
  identify a driver event using a pattern of objects including the traffic sign and the vehicle in the image data, the driver event involving the traffic sign and associated with a driver event rule specifying a reference vehicle operating behavior for the driver event, the reference vehicle operating behavior including observance of the traffic sign;
  evaluate compliance with the driver event rule for the driver event by at least:
    a) calculating a proximity of the traffic sign to the vehicle based on i) a distance between the vehicle and the traffic sign and ii) an operating state of the vehicle, the distance determined using a geographic location of the vehicle and a geometry between the vehicle and the traffic sign extracted from the image data;
    b) comparing the proximity of the traffic sign and the operating state of the vehicle to determine an actual vehicle operating behavior; and
    c) generating a score associated with operation of the vehicle by comparing the actual vehicle operating behavior with the reference vehicle operating behavior; and
  output the score to quantify an evaluation of the actual vehicle operating behavior.

10. The at least one tangible computer-readable storage medium of claim 9, wherein the at least one tangible computer-readable storage medium is included in a cloud-based server, and wherein the instructions, when executed, cause the at least one processor to exchange driver events among a plurality of mobile devices.

11. The at least one tangible computer-readable storage medium of claim 9, wherein the instructions, when executed, cause the at least one processor to implement an artificial neural network to process the image data with independent component analysis to identify the traffic sign in the image data.

12. The at least one tangible computer-readable storage medium of claim 9, wherein the instructions, when executed, cause the at least one processor to implement an artificial neural network to process the image data with cascade learning to identify the traffic sign in the image data.

13. The at least one tangible computer-readable storage medium of claim 9, wherein the traffic sign is a stop sign.

14. The at least one tangible computer-readable storage medium of claim 9, wherein the operating state includes a speed of the vehicle.

15. The at least one tangible computer-readable storage medium of claim 9, wherein the instructions, when executed, cause the at least one processor to evaluate compliance with the driver event rule using one or more driving metrics including at least one of: a) compliance with stop signs, b) compliance with traffic lights, c) compliance with speed limits, d) turn signal usage, e) cornering g-force, f) lane centering, or g) lead car proximity.

16. The at least one tangible computer-readable storage medium of claim 9, wherein the instructions, when executed, cause the at least one processor to generate a profile with the score, the score forming part of the profile including an overall score and one or more driving metric scores for at least one vehicle operator.

17. A computer-implemented method of vehicle operation analysis, the method comprising:
  processing, by executing an instruction using at least one processor, image data obtained by a camera showing an environment including a) at least a portion of a vehicle and b) a traffic sign external to and in proximity to the vehicle and wherein processing the image data includes isolating features in the image data to identify the traffic sign in relation to the vehicle based on at least one of a shape, color, or content of the traffic sign;
  identifying, by executing an instruction using the at least one processor, a driver event using a pattern of objects including the traffic sign and the vehicle in the image data, the driver event involving the traffic sign and associated with a driver event rule specifying a reference vehicle operating behavior for the driver event, the reference vehicle operating behavior including observance of the traffic sign;
  evaluating, by executing an instruction using the at least one processor, compliance with the driver event rule for the driver event by at least:
    a) calculating a proximity of the traffic sign to the vehicle based on i) a distance between the vehicle and the traffic sign and ii) an operating state of the vehicle, the distance determined using a geographic location of the vehicle and a geometry between the vehicle and the traffic sign extracted from the image data;
    b) comparing the proximity of the traffic sign and the operating state of the vehicle to determine an actual vehicle operating behavior; and c) generating a score associated with operation of the vehicle by comparing the actual vehicle operating behavior with the reference vehicle operating behavior; and outputting, by executing an instruction using the at least one processor, the score to quantify an evaluation of the actual vehicle operating behavior.

18. The method of claim 17, wherein the at least one processor is included in a cloud-based server, and wherein the method further includes exchanging driver events among a plurality of mobile devices.

19. The method of claim 17, further including implementing an artificial neural network to process the image data with at least one of independent component analysis or cascade learning to identify the traffic sign in the image data.

20. The method of claim 17, wherein evaluating compliance with the driver event rule further includes evaluating compliance with the driver event rule using one or more driving metrics including at least one of: a) compliance with stop signs, b) compliance with traffic lights, c) compliance with speed limits, d) turn signal usage, e) cornering g-force, f) lane centering, or g) lead car proximity.

* * * * *